United States Patent [19]

Bouwen et al.

[11] 4,068,247

[45] Jan. 10, 1978

[54] LIGHT-TIGHT CASSETTE

[75] Inventors: Alfons August Bouwen, Ranst; Edward Buelens, Kontich, both of Belgium

[73] Assignee: AGFA-GEVAERT N.V., Mortsel, Belgium

[21] Appl. No.: 680,597

[22] Filed: Apr. 26, 1976

[30] Foreign Application Priority Data

Apr. 29, 1975 United Kingdom ............... 17787/75

[51] Int. Cl.[2] .............................................. G03B 17/26

[52] U.S. Cl. .................................. 354/275; 242/71.1; 352/78 R

[58] Field of Search ............... 354/174, 275, 276, 277, 354/281, 282; 352/72, 159, 78 R; 242/71.1, 71.3, 71.4, 71.7

[56] References Cited

U.S. PATENT DOCUMENTS

| | | | |
|---|---|---|---|
| 3,199,117 | 8/1965 | Bolsey | 352/72 X |
| 3,480,226 | 11/1969 | Roman | 242/71.7 |
| 3,514,195 | 5/1970 | Nemeth | 352/72 |
| 3,810,229 | 5/1974 | Dunning et al. | 354/281 |
| 3,858,829 | 1/1975 | Bradt et al. | 352/72 X |
| 3,871,755 | 3/1975 | Wright | 352/72 X |
| 3,955,779 | 5/1976 | Bielik | 352/72 X |

FOREIGN PATENT DOCUMENTS

| | | | |
|---|---|---|---|
| 1,128,282 | 4/1962 | Germany | 354/277 |
| 1,232,460 | 1/1967 | Germany | 354/275 |

*Primary Examiner*—Edna M. O'Connor
*Attorney, Agent, or Firm*—William J. Daniel

[57] ABSTRACT

A light-tight plastic cassette for a roll of light-sensitive photographic material, which may be readily assembled, and is constituted by an extruded tubular body portion and molded end caps. The end caps have uniformly spaced outer and interior flanges forming a channel engaging the end margins of said body portion, said interior flange having along its corner portions extensions which have an axial dimension exceeding the axial dimension of the outer flange.

8 Claims, 10 Drawing Figures

LIGHT-TIGHT CASSETTE

The present invention relates to a light-tight cassette for holding a roll of light-sensitive photographic material.

The invention relates in particular to a cassette for photographic material for use in phototype-setting apparatus.

In such application of photographic material use is made of a known package constructed from a blank of corrugated paperboard which has been cut and folded to form an elongated square-shaped box with an elongate slot through which the photographic material may be pulled out of the box. The light-tightness of this package is ensured by a black plastic bag into which the roll of photographic material is wrapped and which extends with its open end through the slot of the box over a distance of about one centimeter.

The mentioned package itself is cheap as a consequence of the kinds of materials used for its construction. However, the assembling and filling are time consuming and thereby the overall costprice of the product is unfavourably influenced.

Furthermore, the mentioned package has a non-attractive appearance, and it raises quite often problems in connection with light-tightness, and for some types of photographic material it may be insufficiently moisture proof.

The present invention aims to provide an improved package, in particular for the mentioned type of photographic material, which does not show the disadvantage of the prior art package.

In accordance with the present invention, a light-tight cassette for holding a roll of light-sensitive photographic material a shell portion of approximately square which includes an extruded generally square tubular body portion of resilient material, the body being open at both of its ends and having adjacent one of its corners a slit extending the entire axial dimension thereof, the opposite edges of the slit having integral tongues projecting in generally parallel relation inwardly of said corner, to define a narrow egress opening for passage of the photographic material out of the cassette. A shaped end cap closes each such open end of the body portion, each cap having uniformly spaced outer and inner flanges extending around its periphery to form a channel engaging the end margins of the body portion periphery to compress the same to render the cassette light-tight at its open end when the cap is in position, the interior flange having extensions along at least the corner portions thereof projecting inwardly substantially past the interior limits of the outer flange, one of these corner extensions being interrupted to receive the end portion of the inwardly projecting tongues therebetween. The cap also has an inwardly projecting hub for rotatably supporting the roll of photographic material, the axial dimension of said hub exceeding the axial dimension of said channel. Strips of compressible material are fitted to the mutually facing surfaces of said tongues which form said egress opening, thereby to render the cassette light-tight over its length when the cap is in position.

The following are preferred but optional features of the cassette according to the present invention.

The shell portion in open at both ends, and there is provided an end cap for closing each such open end. This configuration is particularly interesting since it may permit the shell portion of the cassette to be made by extrusion, and the end caps to be made by injection moulding from a suitable plastic.

The two lips make part of two adjacent wall sections thereby to form a mouth which is situated close to a corner of the shell portion.

The end caps are of symmetric construction in case two end caps are used, thereby to permit one type of end cap to be used for closing both ends of the shell portion.

The portions of the inner flange which are situated between the corner portions of an end cap have a height which is so much reduced with respect to the height of the corner portions, that a roll of photographic material positioned on the hub is capable of protruding freely between the corner portions of said inner flange subject only to the limit of the inner face of the shell portion.

Both lips are provided with curved end portions thereby to provide a widened opening at the internal end of the mouth whereby a smooth guidance for the photographic material is obtained for new as well as for nearly completed rolls thereof.

The invention will be described hereinafter by way of example with reference to the accompanying drawings wherein.

Figure 1:
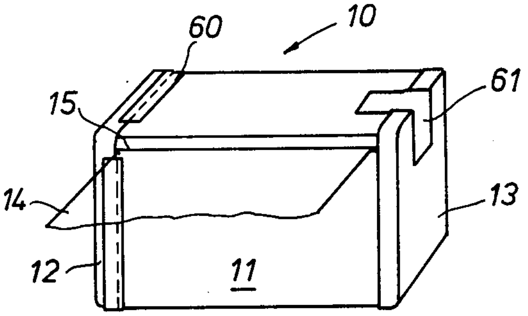
FIG. 1 is a perspective view of one embodiment of a cassette according to the invention.

Referring to FIG. 1, a cassette 10 for holding a roll 37 of light-sensitive photographic material comprises a tubular body portion 11 and two end caps 12 and 13. The web 14 of photographic material is pulled off the roll 37 through a slot-like opening 15 which extends between the two end caps. In the figure, the photographic material has been illustrated as being transparent.

Figure 2:
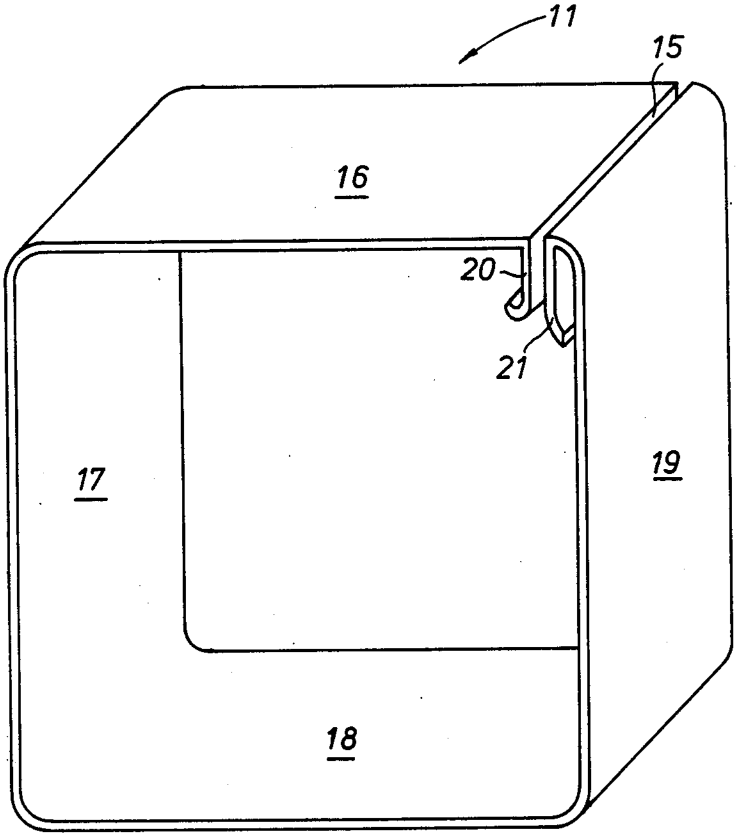
FIG. 2 is a perspective view of the tubular body portion.
Figure 3:
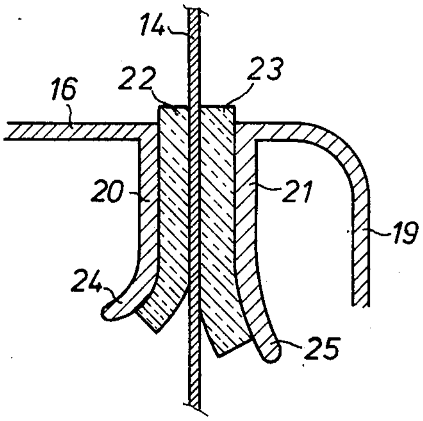
FIG. 3 is an enlarged view of the mouth of the cassette.

The body portion 11 is illustrated in detail in FIG. 2, and comprises four flat wall sections 16 to 19 joined by corner portions curved through 90 angular degrees, and two tongues 20 and 21. The tongues are in fact integral extensions of the adjacent wall portions that are inwardly angled over 90° with respect to adjacent wall section 16 and generally parallel to the other adjacent wall section 19 and define together a mouth or slotlike egress opening 15. Strips 22 and 23 of light-excluding compressible material such as velvet or felt ribbon line the mutually facing surfaces of the tongues 20 and 21, as shown on an enlarged scale in FIG. 3. The inner end portions 24 and 25 of the lips are curved or flared as shown in order to provide a widened inlet for the mouth so that a web emanating from a fresh roll may be as smoothly pulled through the mouth as a web pulled from a nearly consumed roll. In addition, the curved end portions 24 and 25 increase the stiffness or rigidity of the lips 20 and 21. Considerable stiffness to these lips has already been imparted as a consequence of the disposition of the lips at an angle, 90° in the present case, with respect to the wall section 16. Because of the combination of these measures, a overall high resistance to deformation of the mouth is obtained. This feature is quite very important in the case of cassettes of a relatively great length, bearing in mind that the only places where force can be applied to urge or bias the lips 20 and 21 towards each other are the lateral ends of the lips where the end caps 12 and 13 fit over the shell portion, so that even a slight bending of the lips along their length can result in insufficient pressure between the central portions of the linings 22 and 23.

The simple design of body portion 11 lends itself particularly to manufacture from plastic by extrusion. An additional advantage of such manufacturing technique is that the body portion is available in unlimited sizes since the required lengths for the shell portion may simply be cut from an extruded, appropriately shaped tubular stack. The mentioned technique offers an almost ideal solution to the problem of providing cassettes for rolls of photographic material of different widths, the lengths of such rolls being constant for quite a number of different widths. Suitable plastics for the shell portion are polyvinyl chloride, polystyrene, ABS, polyethylene, etc.

Figure 4:
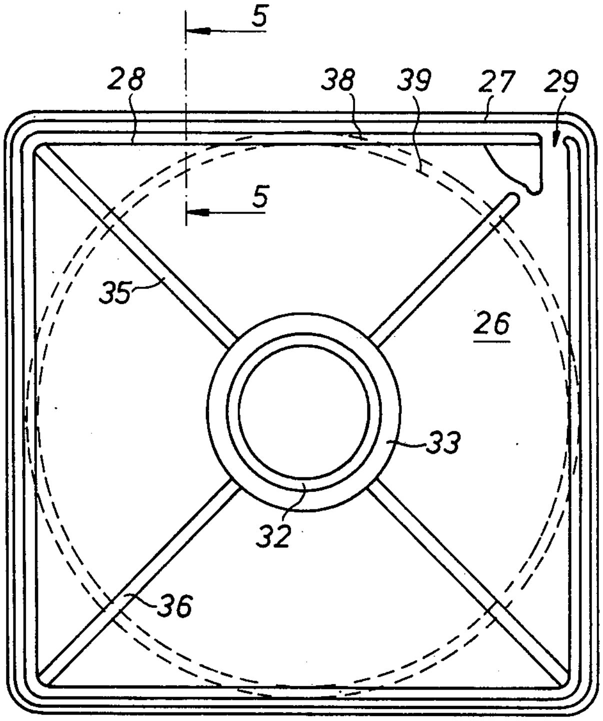
FIG. 4 is a plan view.
Figure 5:
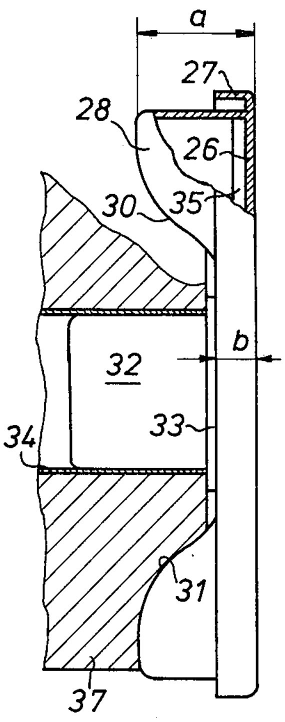
FIG. 5 is a side view of an end cap, the upper portion of this figure being a section on line 5—5 of FIG. 4.

An end cap for the cassette is illustrated in detail in FIGS. 4 and 5. The cap has an end wall 26 of generally square shape, a first or outer flange 27 of substantially constant i.e. axial dimension extending around the periphery of the end wall 26, and a second or inner flange 28, which lies internally of the flange 27 and is spaced therefrom over a distance which is slightly in excess of the wall thickness of the body portion 11. The flange 28 has an interruption or notch at 29 to allow the lips 20 and 21 of the shell portion to extend therethrough towards the interior of the cassette. The flange 28 is extended inwardly, at least at the corner portions, a length substantially exceeding the axial dimension of the flange 27. The purpose of these extensions at the corners of the end cap is to facilitate the correct angular registration of the end cap with respect to the shell portion 11, before the flange 27 engages said shell portion whereby the fitting of the end cap to the shell portion in a darkroom is greatly facilitated.

The length, i.e. axial dimension of the flange 28 need not be constant but may, on the contrary, vary from a maximum as indicated by *a* in FIG. 5 to a minimum as indicated by *b*, which may be equal to the length of the flange 27. The reduced length of the intermdiate sections of flange 28 may have two favourable effects.

First, where the reduced length is such that the full height of the hub 32 becomes exposed, then a roll of photographic material which is positioned on the hub may protrude freely between the more elevated corner portions of the flange subject only to the limit of the inner face of the body portion. This is shown by the circle 38 indicated in broken lines in FIG. 4 which illustrates the maximum diameter of a roll to be used in a cassette which is arranged as described hereinbefore. If the flange 28 were not partially cut away as described, then the maximum diameter of a roll would be limited to the one illustrated by the circle 39. The difference between the two roll diameters may appear very small, but it should be considered that for a wall thickness for the flange of, for instance, 1.5 mm and a roll diameter of 90 mm, the difference in length of material wound onto the roll may amount to about 8%.

Second, where the transitions from the extensions to the shorter intermediate section of the flange 28 does not occur abruptly but rather progressively or gradually as illustrated by the inclined edges 30 and 31, these inclined edges may be helpful in closing the cassette if for one reason or other the corresponding wall of the body portion were slightly bent or warped towards the interior rather than perfectly straight. If in such case the flange 28 would have a uniform height, it would require considerable skill from the operator to slide the bent wall of the body over the flange 28. However, with a flange which decreases in length progressively from the corners towards the centre, such occasionally warped central portions of the body are progressively urged outwardly as the end cap is being put in place, so that finally the rim of the body portion is smoothly engaged between the flanges 27 and 28.

The hub 32 is arranged centrally of the end cap for rotatably supporting a roll 37 of photographic paper wound on a core 34, as illustrated partially in cross-section in FIG. 5. The length of the hub is greater than the maximum length of the flange 28, and offers thereby the advantage that, for a roll which is located within the body portion, the hub of the end cap may be properly brought into engagement with the core of the roll before the cap makes engagement the body portion itself. A collar 33 on the hub determines a limit for the core 34 containing the roll 37 and insures that the edge of the paper wound onto the roll remains apced from the free rim of the flange 27 by a small distance, for instance a distance of one millimeter.

Finally, rib members such as 35 and 36 fitted on the inner surface of the end wall 26 provide sufficient stiffness for said end wall.

An end cap as described lends itself in particular to manufacture from plastic by injection molding. Known plastics for said manufacture may be polyvinyl chloride, polystyrene, acrylonitrile butadiene styrene, etc.

The end caps may be permanently secured to the ends of the body portion by adhesive bonding. In case of a cassette, however, which is intended for re-use by the customer, it is necessary for one end cap to be removably fitted to the body portion.

In the simplest way, such removable fitting may be achieved by the natural resilience or elasticity of the materials used for the manufacturing of the body portion and the caps, so that the caps remain sufficiently firmly clamped on the shell portion to permit transport and manipulation of the cassette on the one hand, but yet may be pulled by the operator from the shell portion without the use of special tools as the cassette must be reloaded in the dark-room on the other hand. It will be understood that in the case of a removable end cap, additional measures may be taken for retaining such cap on the shell portion. Such measures may comprise the provision of a self-adhesive tape at the ends of the cassette, as illustrated by a tape 60 or a label 61, see FIG. 1.

Figure 6:
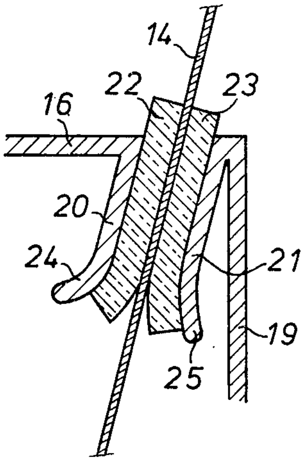
FIG. 6 is a modified embodiment of the egress slot or mouth of the cassette.

It will be understood that the cassette according to the present invention is not limited to the described embodiment. The tongues 20 and 21 may for instance be displaced more towards a corner of the body portion, so that a configuration as illustrated in FIG. 6 may be obtained.

The hub of the end caps may also be formed as an embossed portion of the end wall 26. The ribs 35 and 36 may also be embossed portions of the end wall 26, rather than stiffening members provided on the internal surface of the wall 26, illustrated in FIG. 4.

A cassette wherein the latter features are incorporated is illustrated in detail in FIGS. 7 to 10.

Figure 7:
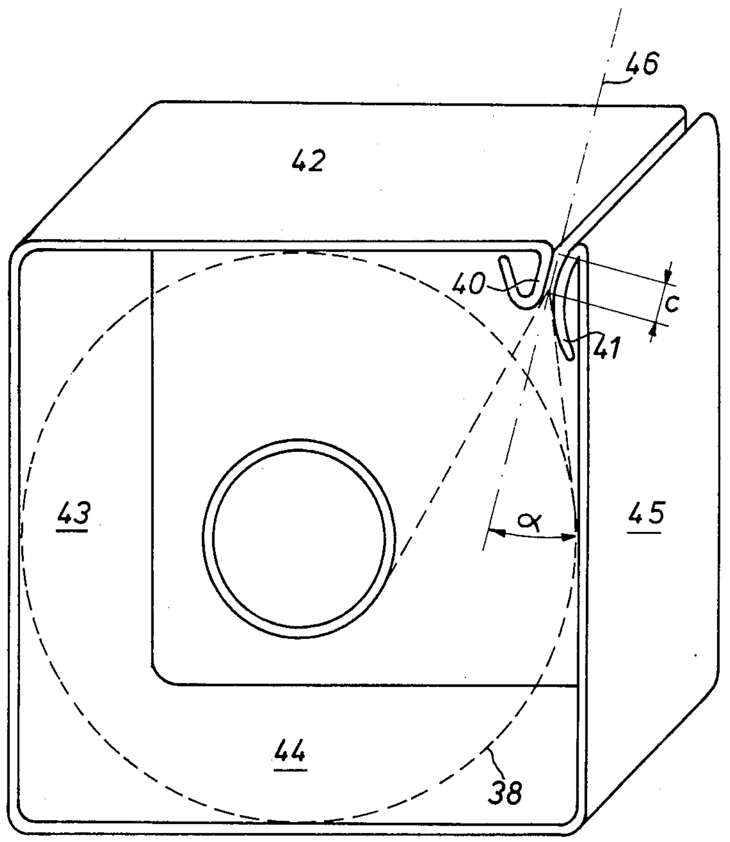
FIG. 7 is a perspective view of the shell portion of another embodiment of a cassette according to the invention.

Referring to FIG. 7, the body portion is provided with tongues 40 and 41 which can be considered as inwardly folded extensions of the corresponding wall sections 42 and 45. Both tongues have a flat portion which extend over a distance indicated by *c*, so that they define a mouth which is inclined at an angle of about 15°, as indicated by the angle $\alpha$ comprised between the line of symmetry 46 of the mouth and the plane of the wall section 45.

In spite of the asymmetric configuration of the mouth of the body portion, the latter can be closed by end caps of symmetric configuration. This has the great advantage that end caps of a single design may now replace both left and right hand end caps which are required in the embodiment of the cassette illustrated in FIGS. 1 to 5.

Figure 8:
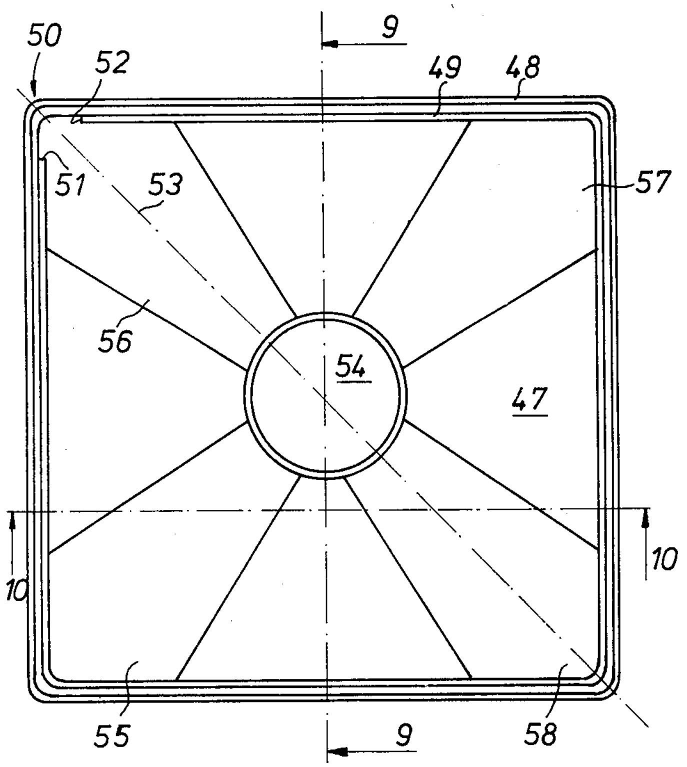
FIG. 8 is a plan view of an end cap of a cassette which comprises a shell portion according to FIG. 7.
Figure 9:
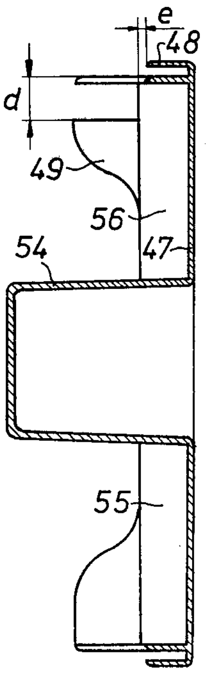
FIG. 9 is a section on line 9—9 of FIG. 8.
Figure 10:
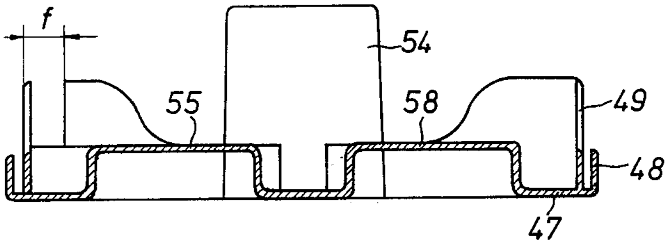
FIG. 10 is a section on line 10—10 of FIG. 8.

Referring to FIGS. 8 to 10, the end cap comprises a wall 47 which has an uninterrupted outer flange 48 and, inwardly thereof and parallel therewith, a second inner flange 49 which is interrupted notched at one corner thereof in the present figure the left hand upper corner 50 in FIG. 8. The extremities 51 and 52 of the interrupted flange 49 lie symmetrically with respect to a diagonal line 53 of the end cap. The symmetric construction is also apparent from FIGS. 9 and 10 wherein *d* equals *f*. It is clear that the described cap may be used on both ends of the shell portion shown in FIG. 7, the flange extremity 51 sliding between the wall section 42 and the innerside of the lip 40, and the flange extremity 52 sliding between the wall section 45 and the inner side of the tongue 41, at one end of the portion, whereas at the other end of the portion the flange extremity 51 engages the wall section 45 and the tongue 41, and the flange extremity 52 engages the wall section 42 and the tongue 40.

The end cap further comprises a hub 54 and rib members 55 to 58 of embossed construction. The advantages of these constructions are material savings in general, and a greater rigidity of the end cap in particular. An additional advantage of the rib members 55 to 58 may be formed by their abutting support of the lateral ends of a roll of photographic material. Thus, in the modified embodiment of cassette there is no collar 33 as in the cassette illustrated in FIG. 4 for providing a lateral support for the core of the roll of material but, on the contrary, the end faces of the roll of material are in direct abutting contact with the raised rib members of the end caps. Since these rib members offer a substantial contact area for the roll, the pressure on the edges of the photographic material is sufficiently low for preventing damaging of said material, and for keeping wear of the rib surfaces within acceptable limits.

If the height of the rib members 55 to 58 is such that the plane of the inner surfaces of said ribs is clear of the flange 48, as indicated by the distance *e* in FIG. 9, then it is ensured that the photographic material may be pulled out of the cassette without risk of its edges rubbing on the rim of the flange 48.

Finally, it will be understood that the light-tightness of the described cassette will be ensured by strips of compressible light-excluding material similar to the strips 22 and 23 described hereinbefore, and that both end caps or, as the case may be only one, are arranged for removable fitting to the body portion.

The cassette according to the present invention will mostly be sufficiently moisture-proof if manufactured in plastic with a wall thickness of 1 to 2 mm. In the case of certain types of photographic material which are particularly sensitive to moisture, the cassette containing a roll of fresh material may be hermetically sealed in a usual wrapper laminate consisting of paper, aluminium and polyethylene bonded together. Such wrapper may then provide protection against moisture during the period the cassette is stored. For a cassette which is reloaded by the user, the fresh roll of photographic material as supplied by the photographic manufacturers may be wrapped in such moisture-proof wrapper.

We claim:

1. A light-tight cassette for holding a roll of light-sensitive photographic material comprising:

an extruded generally square tubular body portion, which is of resilient material, said body being open at both of its ends and having adjacent one corner a slit extending the entire axial dimension thereof, the edges of said slit having integral tongues projecting in generally parallel relation inwardly of said corner, to define a narrow egress opening for passage of said material out of the cassette, a shaped end cap for closing each such open end of said body portion, said cap having uniformly spaced outer and interior flanges extending around its periphery to form a channel engaging the end margins of said body portion periphery to compress the same to render said cassette light-tight at said open end when the cap is in position, said interior flange having inwardly projecting extensions along at least the corner portions thereof substantially past the interior limits of the outer flange, one of said corner extensions being interrupted to receive the end portion of said inwardly projecting tongues therebetween, said cap having an inwardly projecting hub for rotatably supporting the roll of photographic material, the axial dimension of said hub exceeding the axial dimension of said channel, and strips of compressible material which are fitted to the mutually facing surfaces of said tongues which form said egress opening, thereby to render said cassette light-tight also over its length when said cap is in position.

2. A light-tight cassette according to claim 1, wherein each end cap is the mirror image of the other.

3. A light-tight cassette according to claim 2, wherein the end caps are injection molded.

4. A light-tight cassette according to claim 1, wherein the portions of the interior flange which are situated between the inwardly projecting corner portions have an axial dimension such as to be clear of the roll periphery so that the maximum diameter for the roll of photographic material is limited only by the inside dimensions of said tubular body portion.

5. A light-tight cassette according to claim 1, wherein the edges of said interior flange extensions are inclined away from the respective corner.

6. A light-tight cassette as in claim 1, wherein said tongues project generally parallel to one adjacent wall of said tubular portion with generally flaring ends to facilitate passage of said material therebetween.

7. A light-tight cassette as in claim 1, wherein each end cap is provided adjacent the base of said hub with abutment surfaces extending in generally coplanar relation to the inner termination of said outer and interior flanges, whereby the end faces of the roll of photographic material are aligned axially for proper delivery of the material therefrom through said egress slot.

8. A light-tight cassette as in claim 1, wherein the axial dimension of said hub exceeds the maximum axial dimension of said inner flange including said extensions.

* * * * *